March 15, 1966   J. A. MOULTON   3,241,068
ELECTRONIC MULTIPLIER FOR TERRAIN AVOIDANCE RADAR SYSTEM
Filed July 17, 1962                6 Sheets-Sheet 1

INVENTOR.
JAMES A. MOULTON
BY
ATTORNEY

March 15, 1966 J. A. MOULTON 3,241,068
ELECTRONIC MULTIPLIER FOR TERRAIN AVOIDANCE RADAR SYSTEM
Filed July 17, 1962 6 Sheets-Sheet 2

INVENTOR.
JAMES A. MOULTON
BY Roy M Pitts
ATTORNEY

FIG. 4

INVENTOR.
JAMES A. MOULTON
BY
ATTORNEY

INVENTOR.
JAMES A. MOULTON

United States Patent Office 3,241,068
Patented Mar. 15, 1966

1

3,241,068
ELECTRONIC MULTIPLIER FOR TERRAIN
AVOIDANCE RADAR SYSTEM
James A. Moulton, Santa Ana, Calif., assignor to
North American Aviation, Inc.
Filed July 17, 1962, Ser. No. 211,476
12 Claims. (Cl. 325—326)

This device relates to an electronic multiplier for providing an output signal indicative of the product of the amplitudes of two input signals, and more particularly to elecrtonic means for controlling the gain in amplifying one signal in accordance with the amplitude of a second signal.

In the use of monopulse radars in airborne systems in which information is sought concerning the terrain, automatic computing signal means are utilized to provide a signal indicative of the vertical height of an aircraft above the terrain or other obstacle. Such computation involves the steps of (1) determining the elevation boresight angle of the target or obstacle off the antenna boresight axis, and (2) determining the elevation angle of the boresight axis relative to the horizon plane, in order to determine the elevation target angle of the obstacle. Such computation also involves the steps of (1) determining the slant radar range of the obstacle relative to the aircraft and (2) multiplying the radar slant range by the target angle to determine the distance by which the aircraft will clear the terrain feature or obstacle. A ramp function signal (that is, one which increases in value with time) is triggered or synchronized with the monopulse system trigger. As the ramp function signal increases, it indicates increasing time delay in the radar return signal. Explained another way, the ramp signal increases as the radar signal returns from objects farther and farther away. The radar return signal, in the elevation channel is a video signal having a frequency spectrum of approximately 200 cycles per second to 2 megacycles per second. If a single pulse is transmitted (as in pulsed radar) a return signal is received from each reflecting point within the area illuminated by the transmitted energy. The return signal is received at intervals corresponding to the radar range of the target or terrain obstacle. Additionally, the computed vertical altitude above the terrain obstacle is compared with a desired clearance altitude to develop a warning signal.

Multiplication of two signals has been performed in the prior art by means of vacuum tube circuits employing two dual control pentodes having the plates thereof commonly connected, each of the signals being applied to mutually exclusive grids in push-pull circuit. Application of one signal causes a differential change in the gain of the other signal, thus producing a plate circuit output signal which is indicative of the product of the two signals such as the product of range and target angle. However, such an arrangement does not provide a suitable null or zero output signal during the intervals when either or both of the signals, such as target angle and range signals are zero. Also, because dual control pentodes are not precision devices, it is extremely difficult to balance the outputs of the pentodes as the pentodes age, or in the presence of fluctuating supply voltages. Further, in airborne applications wherein the device is subjected to the normal vibration environment of the aircraft, inherent microphonic characteristics of the pentodes produce spurious signals of substantial magnitude. Finally, numerous bias adjustments are necessary in order to find initial operating points that produce satisfactory null responses to null inputs and satisfactory linearity for a finite range of inputs. A terrain avoidance computer employing such multiplication means together with a range signal sawtooth generator, is described in co-pending U.S. application, Serial No. 830,675 for Terrain Clearance Radar, filed by William E. Stoney on July 30, 1959, now Patent No. 3,165,740 and assigned to North American Aviation, Inc., assignee of the subject invention.

The present invention is an improvement of the video multiplier described in the above-described U.S. application, Serial No. 830,675. The present invention has as one of its principal objects the multiplication of a video input signal by another signal by controlling the gain of the video input signal, rather than generating a third analog signal representing the product of the two signals. Another object of the present invention is to avoid drift and balance problems by switching in or out circuit elements of a fixed value so as to control gain. Such method may be seen to be a "digital" or "discrete" method of multiplication. Heretofore as explained previously, multiplication was in such instance "analog" in form wherein two signals were multiplied by using multiplied tubes.

In carrying out the invention in accordance with a preferred embodiment thereof, there is provided a monopulse receiver having a periodic system trigger, and providing the video return of periodic target angle signals. The time-phase or time delay of the video target angle signals relative to the system trigger are indicative of the target range, while the amplitudes of the video signals are indicative of target angle. There is provided, in accordance with the invention, circuit means for controlling scaling the gain of the video signals discretely, or in steps, or digitally. Switches in cooperation with control means operatively connect and disconnect selective circuit means for causing the scaling of the video gain to be varied in discrete steps approximating a ramp function, in response to the system trigger. There is further provided compensation switching for reducing variations in output impedance during the period of the periodic system trigger.

By means of the above described arrangement, upon transmission of a single radar pulse, the amplitude of the video signal will be weighted in gain each time a system pulse is sent out and video signals from the illuminated points commence to return. Because the gain weighting of the video signal is representative of the range of the various targets represented by such video signal, while the amplitude of the video signal is representative of the target angle, the resulting attenuated video signal will be representative of the product of the range of each target by its angle. If the elevation channel video information is used, the product of range and elevation angle is obtained. Hence, it is to be appreciated that the device of the invention provides improved signal multiplication means involving circuit elements having a fixed value which will not destroy nor interfere with the returned video signal. Hence, the upper frequency spectral content of the video signal is not lost, and the performance of the device as a high speed multiplier is not limited.

Accordingly, it is an object of the subject invention to provide improved means for multiplying a monopulse system video signal as a function of range.

It is another object of the subject invention to preserve the information in a video signal in multiplying a video signal by radar range.

It is a further object of the subject invention to provide video multiplying means that is not susceptible to microphonics.

It is yet a further object of the subject invention to provide discrete means for controlling the gain of a video signal as a function of time, each time the receiver commences receiving new video return signals.

It is still another object of this invention to provide video multiplier means that require fewer circuit adjustments and which is easy to maintain.

These and other objects of the invention will become apparent from the following description taken in connection with the accompanying drawings in which.

In the drawings, like reference characters refer to like parts.

In the application of an airborne monopulse radar to terrain avoidance functions, it is desired to provide means for controlling an aircraft to a specified clearance height $h_0$ above protruding terrain. In order to perform such function most effectively, arrangement must be made to detect such terrain obstacle and predict the aircraft vertical clearance height relative thereto. This of course must be done beforehand and from a safe range or distance within which necessary maneuvering of the aircraft may be effected. Accordingly, in a terrain avoidance application, the height $h$ is measured from a reference plane 12 down to all illuminated objects which will reflect radar energy and are above clearance plane 14. Only those obstacles protruding above the selected clearance plane, will be indicated by the radar.

Figure 1:
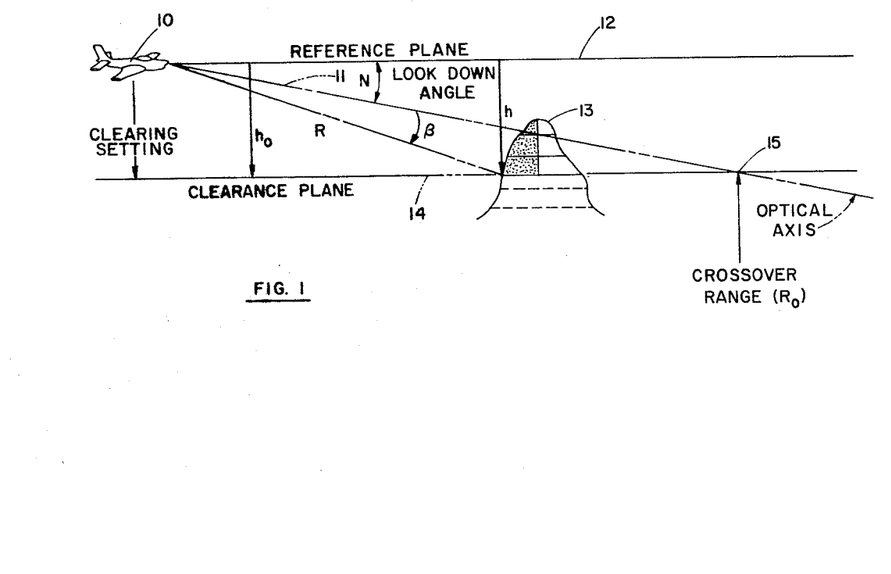
FIG. 1 is an illustration of the geometry of the terrain avoidance problem, the solution of which employs the concept of the invention.

Referring to FIG. 1 there is illustrated the geometry of problem, the solution of which employs the concept of the invention. A low flying vehicle 10 carrying a monopulse radar including an elevation angle detection system, with the boresight of the antenna directed as depicted by the line 11. Line 12 indicates the reference plane which may or may not be the flight path of the vehicle. In general, it does so in order that the clearance of the aircraft (if its course is continued) is indicated. Reference numeral 13 indicates a terrain obstacle such as a hill which protrudes above a preset clearance plane 14 which is selected at some preset distance $h_0$ below the reference plane. The depression angle of the antenna is indicated by the symbol N, and comprises the vertical angle between the reference plane 12 and the antenna boresight 11. In a terrain avoidance system of the type described in the above-mentioned U.S. patent application, Serial No. 830,675, the elevation of the antenna boresight is adjusted so as to intersect with the clearance plane at a fixed slant range distance $R_0$ illustrated in FIG. 1 as occurring at point 15. The angle $\beta$ between the antenna boresight, or centerline and a radar-reflecting target at range R, together with the computed vertical distance $h$ between the target and the reference plane are employed in the terrain avoidance computation.

The perpendicular distance $h$ from the reference plane to the ground is expressed as follows:

$$h = R \sin(N+\beta) \quad (1)$$

However, for the combination of ranges and clearance distances involved in the use of terrain clearance systems, the sine function of an angle is approximately equal to the angle itself in radians. Hence, $$h = R(N+\beta) \quad (2)$$

The warning signal, W, in a terrain avoidance system is defined as:

$$W = h - h_0 \quad (3)$$

where $$h \leq h_0$$
$$W = 0 \quad (4)$$

where $$h > h_0$$

Hence, where the obstacle lies below the clearance plane ($h > h_0$), no warning signal occurs.

It is to be observed that the computation of clearance height, $h$, of the reference plane above the obstacle employs the product of the radar range of the obstacle and the target angle subtended by the obstacle and the reference plane, measured from the monopulse antenna (or aircraft). The derivation of the video signal indicative of the target angle $(N+\beta)$ is well understood in the art and is described, for example, in the above-mentioned U.S. patent application, Serial No. 830,675. Such information is derived, for example, from the sum and difference signals $E_s$ and $E_d$ respectively (in a sum and difference type angle detection monopulse system) and by employing the geometrical constants of the terrain avoidance problem. In the angle $(N+\beta)$, the component angle, N, is defined by the geometrical constants of FIG. 1 as:

$$N = \tan^{-1}\frac{h_0}{R_0} \approx \frac{h_0}{R_0} \quad (5)$$

The angle $\beta$ is derived from the monopulse operation as:

$$\beta = K\frac{E_d}{E_s} \quad (6)$$

Therefore, Equation 3 for the warning signal W, may be rewritten as:

$$W = R\left[\frac{h_0}{R_0} + K_i\frac{E_d}{E_s}\right] - h_0 \quad (7)$$

Further, the explicit division indicated by Equation 7 may be avoided in a practical mechanization by rearranging Equation 7 with respect to the sum signal $E_s$:

$$W^1 = WE_s = R\left(\frac{h_0}{R_0}E_s + K_iE_d\right) - h_0E_s \quad (8)$$

Figure 2:
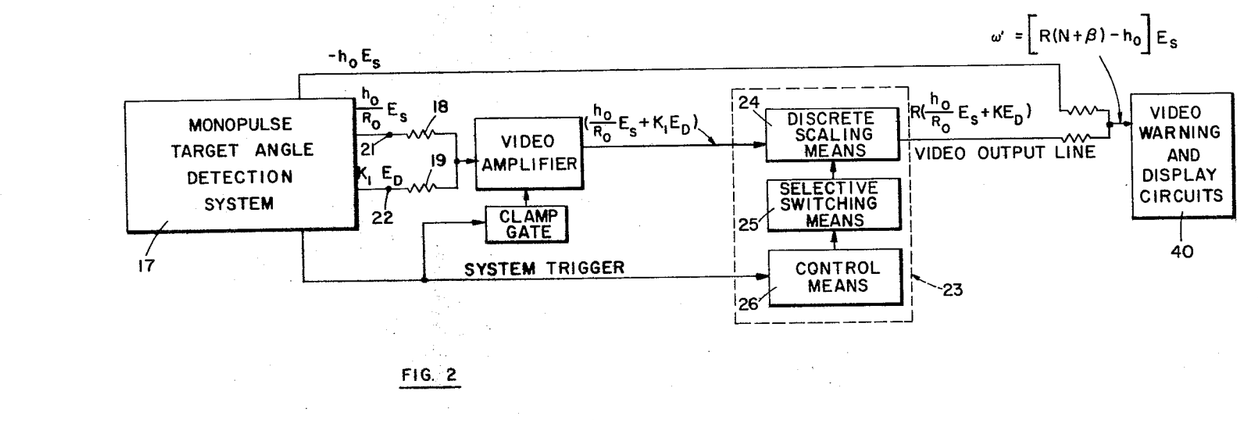
FIG. 2 is a functional block diagram of a terrain avoidance monopulse system employing the concept of the invention.

Hence, the terrain avoidance merchanization need only perform the functions of addition (or comparison) and multiplication. Observing that the terms $h_0/R_0$ and $K_i$ are fixed factors, such terms are provided for by suitably adjusting the scaling or gain levels of the video monopulse signals $E_s$ and $E_d$ associated with these terms. Accordingly, the scaled $E_s$ and $E_d$ video signals may be summed by a resistive summing network at the input to a video amplifier, and the multiplication of the summed video signals $$\left(\frac{h_0}{R_0}E_s + K_iE_d\right)$$

by radar range R accomplished by means of the system shown in FIG. 2.

Referring to FIG. 2, there is illustrated a terrain avoidance computing system employing the concept of the invention. There is provided a monopulse angle detection system 17 for providing scaled sum and elevation difference video signals $$\frac{h_0}{R_0}E_s$$

and $K_iE_d$, respectively.

These video signals are summed by means of a resistive summing network comprised of resistors 18 and 19 at the input of a video amplifier 20.

One terminal of each of resistors 18 and 19 is commonly connected to the input of video amplifier 20. A second terminal of first summing resistor 18 is connected to the sum signal output terminal 21 of monopulse system 17, and a second terminal of second summing resistor 19 is connected to the elevation difference signal output terminal 22 of monopulse system 17.

The construction of video amplifier 20 and monopulse angle detection system 17 is well known in the art, and is described, for example, in the above-mentioned U.S. Patent application, Serial No. 830,675 and in U.S. Patent No. 2,933,380 for an Integrated Aircraft and Fire Control Autopilot, issued April 26, 1960, to John R. Moore et al.

The summed video output from amplifier 20 is fed as a video input to video multiplier 23 which is comprised of discrete scaling or attenuating means 24, selective switching means 25, and control means 26.

Scaling or attenuating means 24 is connected in circuit with the output of video amplifier 20 for gain weighting the video signal in digital or discrete steps in response to selective switching means 25 without changing the identity of the video signal input. In other words, the gain level of the video signal is changed in digital or discrete steps, rather than generating an additional or analog signal which is a function of the video input signal to scaling multiplier 23. Selective switching means 25 is responsively connected to control means 26 for selectively switching the discrete scaling means in such a fashion as to provide a digital or discrete gain function which approximates a ramp function within the period of the periodic system trigger of monopulse system 17. Control means 26 is responsively connected to the system trigger of monopulse system 17 for synchronizing the operation of multiplier 23 therewith, for reasons which will be more fully explained in connection with FIGS. 3(a) and 3(b).

Figure 3A:
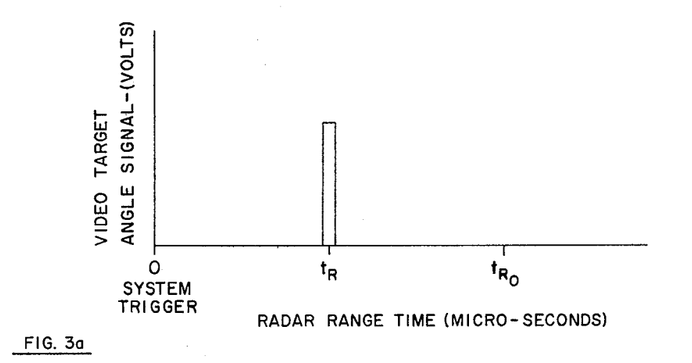
FIGS. 3(a) and 3(b) are representative time histories of the several responses of the system of FIG. 2.
Figure 3B:
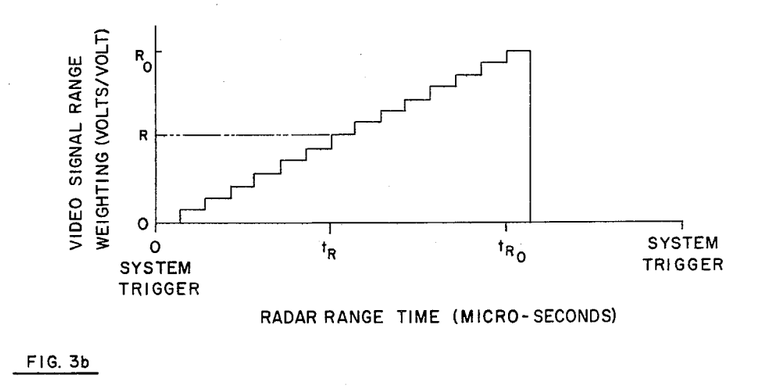

Referring to FIGS. 3(a) and 3(b) there are illustrated representative signal responses of the device of FIG. 2. In normal operation of the device of FIG. 2, the video signal input to multiplier 23 (e.g., target angle signal from video amplifier 20) has a magnitude $V_t$ indicative of the target angle $(N+\beta)$ of Equation 2, and occurs at a time phase, $t_R$, relative to the system trigger which is indicative of the range, R, of such target or terrain obstacle, as shown in FIG. 3(a).

Scaling means 24, selective switching means 25, and control means 26 of FIG. 2 cooperate to provide a discrete signal level or discrete gain weighting which resembles a staircase and approaches a ramp function up to a maximum gain level or gain weighting at time $t_{R_0}$, corresponding to the maximum range $R_0$ of Equation 8, within the period of the system trigger; and then the gain collapses to zero volts output per volt input, as shown in FIG. 3(b). Hence, it is to be appreciated that the gain of scaling means 24 in FIG. 2 varies as a function of time as to simulate radar range. Further, the time phase occurrence of the target angle video signal $V_t$ which is applied to scaling means 24, corresponds to the radar range of the target, which causes such signal. Accordingly, the video input signal to multiplier 23 is gain weighted by a factor indicative of the target range whereby the attenuated signal is indicative of the product of target angle and target range described in Equation 8. In other words, the gain of the video signal is adjusted as a discrete function of the time phase of such video signal.

Figure 4:
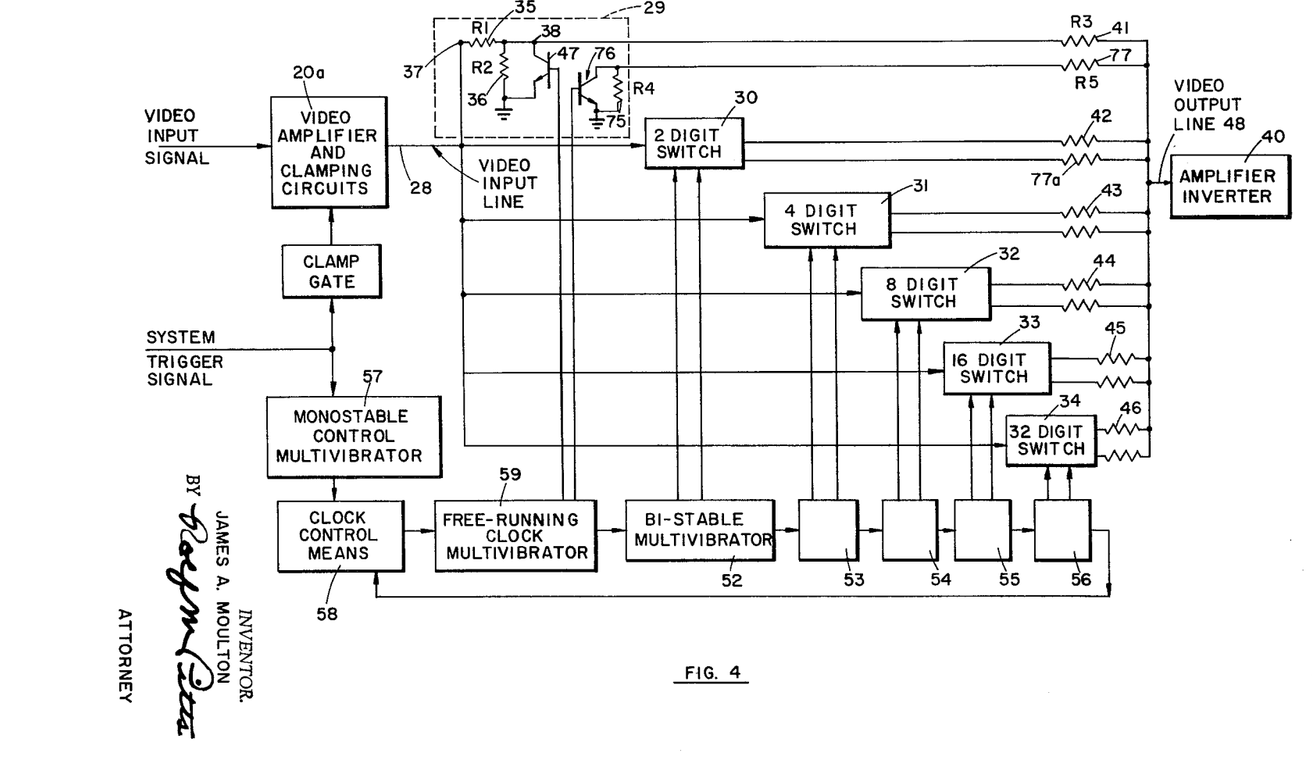
FIG. 4 is a functional block diagram of a preferred embodiment of the invention.

The means of obtaining such described mode of operation of the multiplier 23 of FIG. 2 is to be more fully appreciated from a consideration of the block diagram of the device shown in FIG. 4.

Referring to FIG. 4, there is illustrated a block diagram of a preferred embodiment of the multiplier of FIG. 2. There is provided a source 20a of a periodic video signal, the amplitude and time phase of which are indicative of target angle and target range respectively. There is further provided means for adjusting the gain of the video signal from source 20a as a function of the time phase of the video signal. Such gain adjusting means is comprised of a plurality of signal attenuating and switching networks having inputs commonly connected in circuit to amplifier 20a, for providing binary-coded relative scaling of the video output therefrom; and further providing switching of such mutually relatively scaled video signals. Six such discrete scaling means 29, 30, 31, 32, 33 and 34 are shown, being designated as a 1-digit switch, 2-digit switch, 4-digit switch, 8-digit switch, 16-digit switch, and 32-digit switch, respectively.

Each digit switch is similarly constructed and comprises a series input scaling resistor 35 and parallel output scaling resistor 36 for providing scaling or gain-weighting (e.g., attenuation) of the video signal input, the series resistor 35 being connected in series between the video input and output terminals 37 and 38 of the digit switch, and the parallel resistor being connected across the output of the digit switch. The output of each digit switch is summed at the input of an inverter amplifier by means of a mutually exclusive summing resistor interconnecting the output of an associated digit switch and the input of inverter amplifier 40. For example, the signal output of the 1-, 2-, 4-, 8-, 16- and 32-digit switches is summed by means of video summing resistors 41, 42, 43, 44, 45 and 46 respectively. The resistance value selected for the summing resistors is chosen to be high enough relative to the attenuation network as to provide relative impedance isolation. The values selected for series and parallel resistors 35 and 36 in each digit switch are chosen to provide a relative gain weighting between digit switches in the successive binary-code radio $$1:2:4:8:16:32$$

Switching of the binary code scaled signal output of each digit is provided by means of a switching transistor 47 having its emitter-collector circuit connected across parallel resistor 36, and having its base or control electrode responsively connected to control means for selectively short-circuiting the binary-scaled video signal output from the digit switch.

The control means of the device of FIG. 4 is comprised of a like number of serially-connected bistable multivibrators as digit switches less one, a monostable control multivibrator 57 responsively connected to the system trigger signal source of FIG. 2, and a clock control means 58 responsively connected to control multivibrator 57 and the last one of the serially connected bistable multivibrators for providing a clock control signal.

There is further provided a free-running clock multivibrator 59 responsive to the control signal from clock control means 58, and operatively connected to drive the first one (e.g., element 52) of serially-connected bi-stable multivibrators 52, 53, 54, 55 and 56.

Monostable control multivibrator 57 may be comprised of a so-called "one-shot" multivibrator or other means similarly well known in the art for providing a two-state, monostable circuit element, and accordingly is shown in block form only. The construction of free running multivibrator 59 and bistable multivibrators 52, 53, 54, 55 and 56 is similarly well-known in the art, and these elements are therefore also shown in block form only.

The one-set output from each of elements 59, 52, 53, 54 and 55 is connected to trigger or drive the succeeding one of elements 52, 53, 54, 55 and 56; and is further connected to the base of the switching transistor 47 of an associated digit switch. For example, the one-set output of clock multivibrator 59 is operatively connected to the base of transistor 47 in 1-digit switch 29, and to the input of 2-digit bistable multivibrator 52; the output of 2-digit multivibrator 52 is similarly operatively connected to 2-digit switch 30 and the input of 4-digit multivibrator 53. The output of 4-digit multivibrator 53 is operatively connected to the associated 4-digit switch 31 and 8-digit multivibrator 54, and so forth. It is to be noted that the output of the last one of the serially-connected bi-stable mulivibrators (e.g., 32-digit multivibrator 56) is operatively connected to the associated 32-digit switch 34; and is further connected to clock-control means 58 for shutting off free-running multivibrator 59 when the last bi-stable multivibrator, element 56 is triggered, for reasons which will be more fully explained hereinafter.

Clock control means 58 may be comprised, for example, of a control transistor having its base or control electrode responsively connected to the output of multivibrator 57, and including means for forward-biasing of such transistor by the feedback signal from triggered multivibrator 56.

Figure 5:
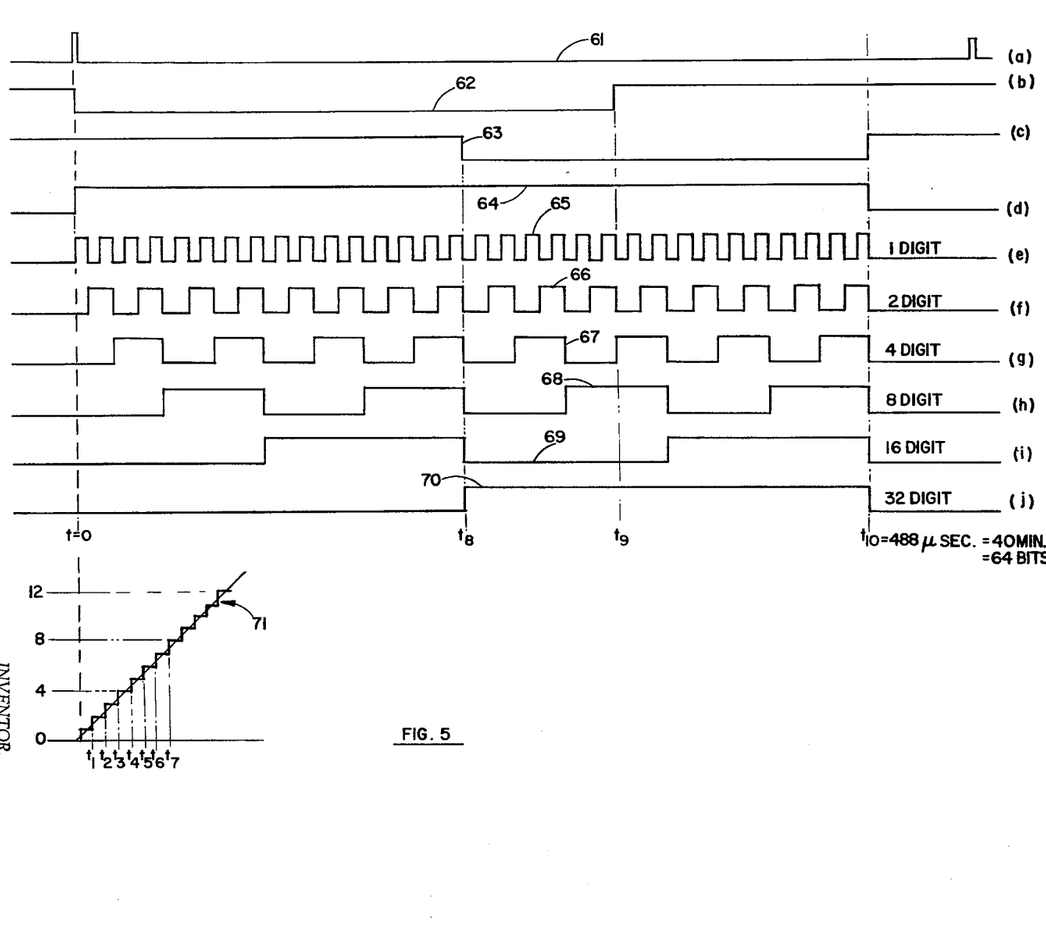
FIG. 5 is a series of representative time histories of the several responses of the device of FIG. 4.

Operation of the device of FIG. 4 may be more easily understood by reference to FIG. 5.

Referring to FIG. 5, there are illustrated representative time histories of the responses of several elements of the device of FIG. 4 over the period of a single cycle of the periodic system trigger. Curve 61 represents the system trigger input to control multivibrator 57. Curve 62 represents the output response of monostable multivibrator 57 to the system trigger, illustrating a bi-polar time constant or time delay of more than one-half cycle in returning to the stable state (e.g., state at time before $t_0$), upon removal of the system trigger excitation or input. The purpose of the time constant is to cause control multivibrator 57 to keep clock control means 58 of FIG. 4 turned on until a feedback signal from multivibrator 56 (e.g., response curve 63) can be employed during the rest of the cycle for control signal purposes, as will be more fully explained hereinafter.

Curve 65 represents the response of free-running multivibrator 59 to control means 58, showing the excitation of such response or output upon the occurrence of the system trigger signal (curve 61). Curve 66 represents the 1-set response of bi-stable multivibrator 52 to the output of clock multivibrator 59, demonstrating the frequency division or change of state (e.g., alternation between the two "off" and "on" states) occurring in response to the change from "on" to "off" state of clock multivibrator 59 (curve 65). Similarly, curves 67, 68, 69 and 70 represent the time histories of the 1-set outputs of 4-digit, 8-digit, 16-digit and 32-digit bi-stable multivibrators 53, 54, 55 and 56 respectively, illustrating the successive frequency division or change of state of each such multivibrator occurring in response to the change from "on" to "off" state of the preceding multivibrator output or driving signal. While curve 70 represents the time history of the 1-set output of 32-digit multivibrator 56, it is to be appreciated that curve 63, being the response of the 0-set response of multivibrator 56, is the mirror image of curve 70.

Further, it is to be appreciated that the 0-set response depicted by curve 70 provides a second control signal input to control means 58 of FIG. 4 whereby the clock control output signal (curve 64) remains "on" even after the duration of the input signal (curve 62) from control multivibrator 57 of FIG. 4. Hence, the response of clock control means 58 (curve 64) remains "on" during the occurrence of the 0-set inputs from either or both of multivibrators 56 and 57 (curves 63 and 62, respectively, between times $t_0$ and $t_{10}$), and changes to the "off" state upon the concurrent "off" state of both of them (e.g., between time $t_{10}$ and the occurrence of the subsequent system trigger).

Upon control means 58 of FIG. 4 switching to the "off" state, clock multivibrator 59 is stopped in the "off" state, stopping the successive frequency division by successive ones of serially-connected bi-stable multivibrators 52, 53, 54, 55 and 56. For the reason that the clock is stopped at the concurrence of the "off" state of the 1-set of 32-digit multivibrator, and because the 1-set output of each successive bi-stable multivibrator switches to the "off" state upon the occurrence of the "off" state of the preceding multivibrator, all of the digit control multivibrators 52, 53, 54, 55, 56 and 59 of FIG. 4 are stopped with the 1-state outputs in the "off" condition, as indicated by curves 65, 66, 67, 68, 69 and 70 at time $t_{10}$. Hence, it is to be understood that the multivibrators are all reset to the condition depicted in FIG. 5 before time $t_0$.

Curve 71 of FIG. 5 represents a time history of the relative gain or weighting of the device of FIG. 4, as measured between video input line 28 and video output line resulting from the cooperation of the digit switches with the associated multivibrators and the summing network of FIG. 4 whereby the cyclic addition of selective combinations of binary scaled outputs from the digit switches produces a relative gain weighting of the video signal input which varies by discrete steps approximating a ramp function. At $t_0$, 1-digit switch 29 is turned on by multivibrator 59, the other digit switches 32, 33, 34, 35 and 36 remaining "off," providing a relative gain weighting of "1" to the video signal transmitted through digit switch 29 to the input of amplifier 40. At $t_1$, multivibrator 59 turns "off" 1-digit switch 29, multivibrator 52 turns "on" 2-digit switch 30, providing a relative gain weighting of "2" to the video signal transmitted through digit switch 30 to amplifier 40. At $t_2$, multivibrator 59 turns "on" 1-digit switch 29, providing a "1" gain weight of "1," in addition to the gain weighting of "2" provided by digit switch 30, these two gained weighted video signals being summed by summing resistors 41 and 42 to provide a total gain weighting of "3" at time $t_2$.

Similarly, at time $t_3$, multivibrators 59 and 52 turn "off" switches 29 and 30 respectively, and multivibrator 53 turns "on" 4-digit switch 31 whereby a relative gain weighting of "4" is provided to the video input to amplifier 40. At time $t_4$, 1-digit switch 29 is turned "on," providing in conjunction with 4-digit switch 31, a gain of "5"; at time $t_5$, switch 29 is turned "off" and 2-digit switch 30 is turned "on," providing in conjunction with 4-digit switch 31 a gain of "6." At time $t_6$ both "1" and "2" digit switches 29 and 30 are turned "on," providing in conjunction with 4-digit switch a combined gain weighting of "7," representing the sum of the gain weightings provided by each switch singly. At successive increments of time, representing a cycle of the clock multivibrator response (curve 65), successive digit switches are similarly sequentially operated in conjunction with selected combination of prior-digit switches being interconnected and arranged as described above, whereby the effective gain between video input line 28 and video output line of FIG. 4 is varied in discrete steps as a function of time, as to resemble a staircase and approximate a ramp function.

Hence, it is to be appreciated that the amplitude of the video analog output signal applied to the input of amplifier 40 in FIG. 4 is indicative of the product of the amplitude and time phase of the video input signal on line 28 of FIG. 4.

It is to be appreciated that the summing resistors 41, 42, 43, 44, 45 and 46 do not provide ideal impedance isolation between the gain weighting video signal channels comprising digit switches 29, 30, 31, 32, 33 and 34. Accordingly, the actual gain weighting contributed by each of the digit switches will be effected by the specific other switches being operating in combination with such switch at any instant. Therefore, the scaling accuracy of the device would be limited, even if $\mp 0\%$ tolerance resistors were used in such structure.

In order to avoid such limitation in the scaling accuracy, auxiliary or compensating impedance switching means is incorporated in each digit switch, whereby the same output impedance is presented in both the "off" and "on" states of the switch. In this way the impedance coupling of the rest of the digit switches remains constant relative to any one of the plurality of digit switches (but for switching transients), over the period of the periodic trigger, and each one of the digit switches may be separately and precisely calibrated. The structure for effecting such compensation is illustrated in FIG. 4.

Referring again to FIG. 4, and more particularly to 1-digit switch 29, there is additionally provided a compensatory shunt resistor 75 connected across the emitter and collector electrodes of a compensatory switching transistor 76. The combination of elements 75 and 76 is connected in series with compensatory summing resistor 77 across the input to amplifier 40. The base or control electrode of compensatory transistor 76 is connected to the 0-set output of associated multivibrator 59.

In the cooperation of compensatory elements 75, 76 and 77 with the prior described gain weighting and digital switching elements associated with switching transistor 47, compensatory transistor 76 is switched "off" by the complementary 0-state output of multivibrator 59 when switching transistor 47 is switched "on," by the 1-state output of multivibrator 59. In other words, transistors 47 and 76 are concurrently switched to mutually exclusive states. Hence, where digit switch 29 is "on" (corresponding to switching transistor 47 being "off"), then compensatory transistor 76 is "on," thereby connecting compensatory summing resistor 77 across the input to amplifier 40. When the digit switch is "off" (switching transistor 47 is "on," shorting the output of video signal terminal 38), then compensatory transistor 76 is "off," leaving compensatory resistors 75 and 77 connected in series across the input to amplifier 40.

Now, if the values of video signal summing resistor 41 and compensatory summing resistor 77 are selected to be approximately mutually equal, and the values of the video signal shunt input resistor 36 and shunt compensatory resistor 75 are approximately mutually equal, then the output impedance presented by 1-digit switch 29 will be the same in both the "off" and "on" states. More precisely, the output impedance of the compensating network for each digit switch in the "off" state is to be the same as that of the video gain switching channel associated with that switch in the "on" state. Further, the output impedance of the compensating network for each digit switch in the "on" state is to be the same as that of the video gain switching channel associated with that switch in the "off" state.

Referring to the 1-digit video signal channel of FIG. 4, for example, in equation form:

$$\frac{R_1 R_2}{R_1 + R_2} + R_3 = R_4 + R_5 \quad (9)$$

$$R_3 = R_5 \quad (10)$$

$$R_4 = \frac{R_1 R_2}{R_1 + R_2} \approx R_2 \quad (11)$$

where $$R_1 > R_2$$

and where $R_1$, $R_2$, $R_3$ and $R_4$ correspond to the resistance values of resistors 35, 36, 41 and 75 respectively.

Such explicit requirement further impliedly requires or implies that transistors 47 and 76 are similar inperformance characteristics.

Figure 6:
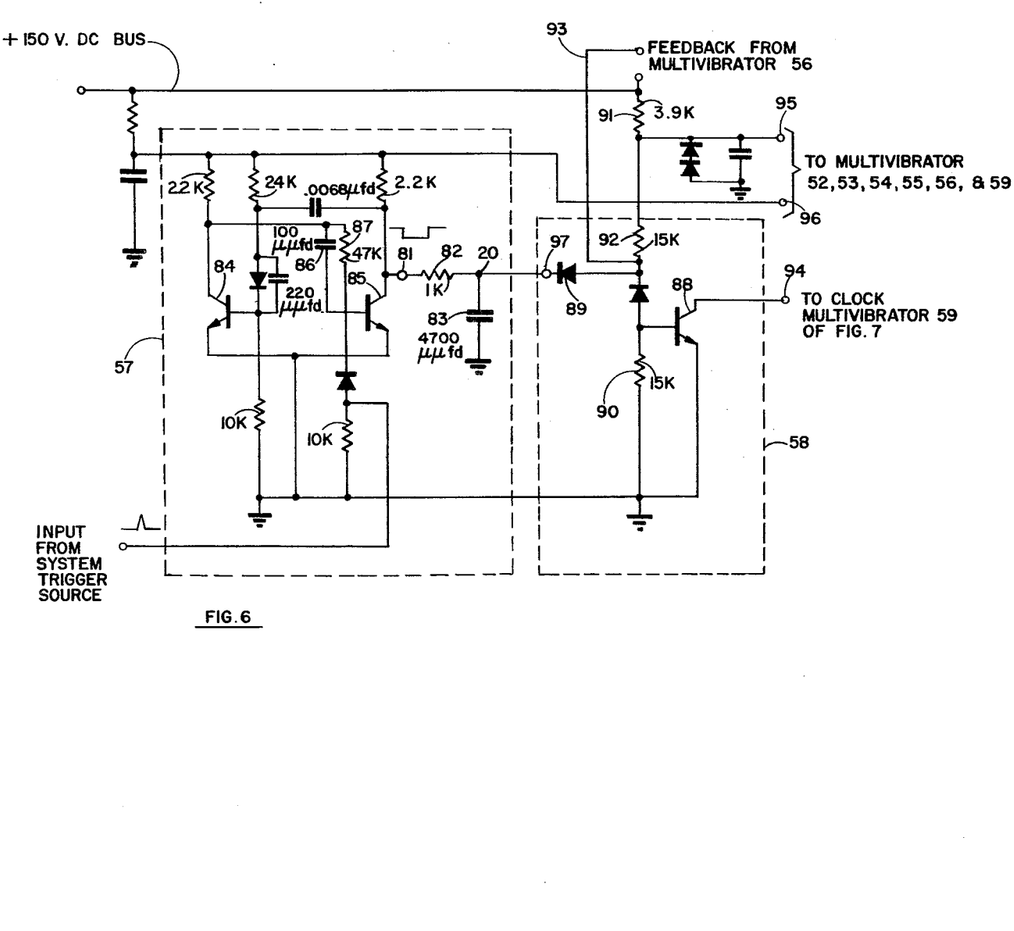
FIG. 6 is a schematic diagram of an exemplary monostable control multivibrator.
Figure 7:
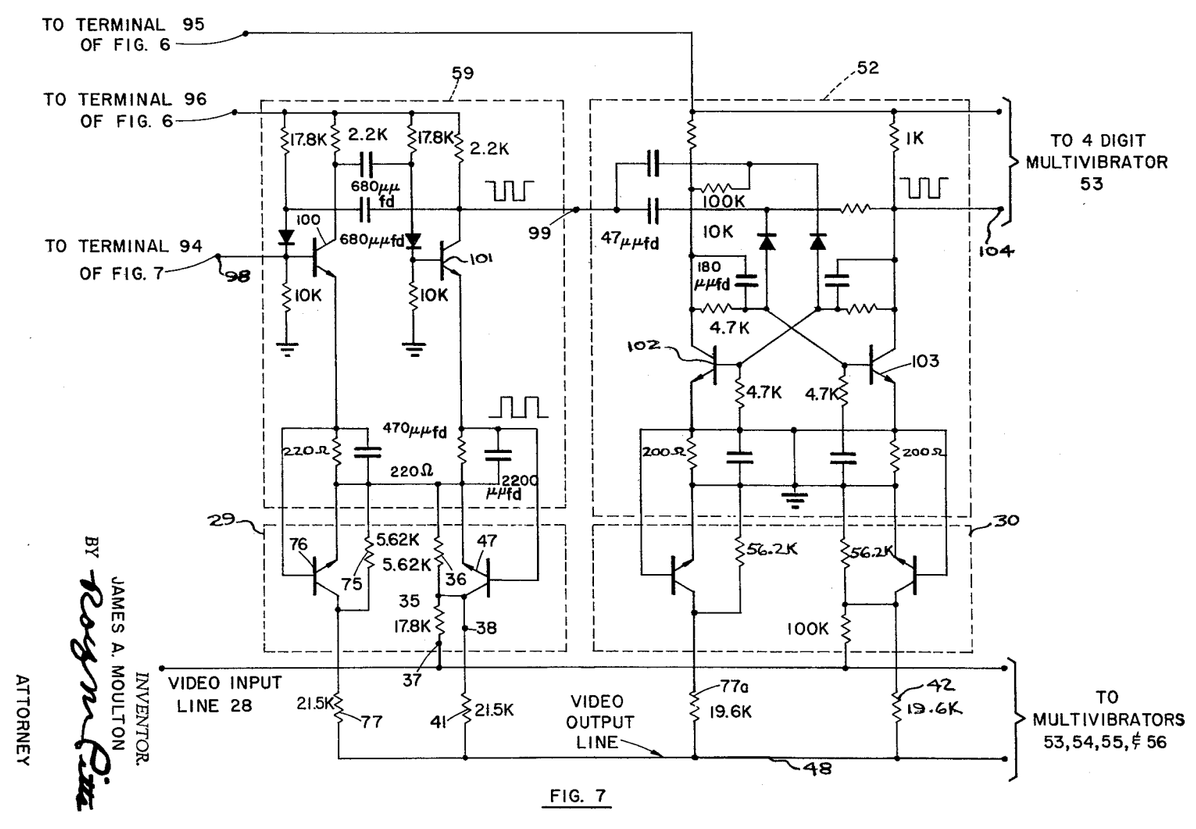
FIG. 7 is a schematic diagram of the free running clock multivibrator, 2 digit bistable multivibrator, 1 digit switch and 2 digit switch of FIG. 4.

A preferred circuit diagram of the cooperation of certain blocks of FIG. 4, illustrating exemplary circuit values therefor, is shown in FIGS. 6 and 7.

Referring to FIG. 6, there is illustrated a detailed circuit schematic diagram of the circuit arrangement of an exemplary monostable control multivibrator 57 and indicating the values of the circuit parameters employed. Multivibrator 57 is a conventional circuit having a conventional output terminal 80 responsively connected to an output signal source 81. However, interposed between signal source 81 and output terminal 80 is a first order lag network comprising series resistor 82 interconnecting source 81 and treminal 80, and shunt capacitor 83 connected across the output of multivibrator 57.

In response to positive going pulses from a system trigger source to one-shot multivibrator 59, a normally on transistor 84 is turned off; and normally off output transistor 85 is turned on, remaining on for a period determined by the time constant of the combination of capacitor 86 and base supply resistor 87. This time constant is selected to be equal to more than one half the period of the periodic system trigger, as previously described in connection with one-shot multivibrator response curve 62 at $t_9$, illustrated in FIG. 5, for the reasons explained in connection therewith. The particular time constant circuit illustrated has been selected for employment with a monopulse radar having a nominal range maximum corresponding to 488 microseconds.

The purpose of the first order lag network interposed at the output of multivibrator 57 is to provide an initial delay in the output signal corresponding to a time delay inserted at time $t_0$ in curve 62 of FIG. 5, by an amount corresponding to about one half the pulse time width $(\Delta t = t_1 - t_0)$ of the output from clock multivibrator 59 (e.g., curve 65 of FIG. 5). In this way, all of the sequential outputs of the serially connected multivibrators of FIG. 4 are all mutually shifted in time by such amount. The reason for such delay is to time-bias the range-gain or cause the first range time increment (corresponding to the leading edge of the unit digit increment of curve 71 in FIG. 5) to occur slightly later than zero time $(t_0)$, and hence avoid indicating an erroneous finite range at zero range time.

The delayed output from terminal 80 of multivibrator 57 is fed to clock control means 58 having an output terminal 94, input terminal 97, and common output input or ground terminal. Clock control means 58 is comprised of switching transistor 88 having the emitter and base electrodes commonly connected to the common output-input or ground terminal, resistor 90 being interposed between the ground terminal and the base electrode.

The input to clock control means 58 from multivibrator 59 is fed to the base or control electrode of switching transistor 88 through series connected clipping diode 89.

The base or control electrode of transistor 88 is also connected by means of line 93 to the 1-state output terminal of multivibrator 56, as shown in block form in FIG. 4. The base or control electrode is further connected to a source of D.-C. potential through forward-biasing resistors 91 and 92, which cooperate with resistor 90 as a bias voltage divider network to bias transistor 88 into the "on" state. Hence, no output signal potential occurs on output terminal 94 because the collector electrode of transistor 88, to which it is connected, is shorted to ground.

In normal operation of the single-shot multivibrator 57 and clock control means 58 of FIG. 6, transistors 84 and 88 are normally "on." Upon receipt of a system trigger signal by multivibrator 57, normally "on" transistor 84 switches to the "off" state, and transistor 85 switches to the "on" state, whereby the potential at the collector of transistor 85 drops, providing a negative-going pulse through lag-network elements 82 and 83 to input terminal 97 of control means 58. In response to an input signal of negative sense applied to either or both of input terminal 97 and input line 93, the forward bias on the control electrode of transistor 88 is overcome, and a switching signal of positive sense appears on output terminal 94 for the duration of such input signal. Upon the removal of the input signals, the output signal ceases.

The ouput signal from clock control means 58 is fed to clock multivibrator 59 shown in FIG. 7.

Referring to FIG. 7, there is illustrated free running clock multivibrator 59, 2-digit bistable multivibrator 52, 1-digit switch 29, and 2-digit switch 30, all arranged and mutually interconnected as like referenced elements of FIG. 4.

Free-running multivibrator 59 is comprised of an input transistor 100 and an output transistor 101, the base of input transistor 100 being connected to input terminal 98 which, in turn, is connected to output terminal 94 of clock control means 58. Multivibrator 59 is connected in driving relation to the input of bistable multivibrator 52 by means of an interconnecting terminal 99.

It is to be appreciated that the forward bias applied to the base of transistor 88 of FIG. 6 causes transistor 88 to conduct, thereby clamping terminal 94 and the base of transistor 100 to ground, whereby free running multivibrator 59 is prevented from running.

In normal operation of the free running multivibrator 59 and the bistable multivibrator 52 of FIG. 7, the base of transistor 100 is "off" by reason of being clamped to ground by normally "on" transistor 88 of FIG. 6. Transistors 101 and 103 are normally "on," prior to the application of the system trigger to the input of one-shot multivibrator 57 in FIG. 6. Upon and during the application of a positive potential to terminal 98 of free running multivibrator 59 (corresponding to turning off transistor 88 of FIG. 6), a series of negative going pulses are applied sequentially at terminal 99, in synchronism and in time phase coincidence with positive going pulses applied to the base of video transistor 47 of 1-digit switch 29 (response curve 65 of FIG. 5), while a series of positive going pulses are applied subsequently to the base of compensatory transistor 76, at 180° time phase relation to the pulses applied to the base of transistor 47. The first and second output of element 59, applied to the base of transistor 47 and 76 respectively of element 29, may be referred to as a 1-state output and 0-state output respectively, for providing signals indicative of the two mutually exclusive states of free-running multivibrator 59, as is will understood in the art.

Normally "off" transistor 102 of bistable multivibrator 52 is turned "on" by the first one and by alternate successive ones of the negative going pulses applied to terminal 99 of FIG. 7 (transistor 103, already being "on" or saturated, does not respond to such input, but is ultimately turned "off" by transistor 102). The second negative going pulse and alternate successive pulses subsequent to such negative pulse applied to terminal 99, cause transistor 103 (being then in the "off" state) to turn on, which action subsequently turns off transistor 102, as is well understood in the bistable multivibrator art. In this way, a negative going pulse output having twice the repetition rate of the negative going pulse input to bistable multivibrator 52 on terminal 99 is provided on terminal 104 to multivibrator 53 of the successive stages of multivibrators illustrated in FIG. 4.

Further, a series of positive going pulses appear at the base of video switching transistor 47 of 2-digit switch 30 (response curve 66 of FIG. 5) in phase with the negative going pulse output at terminal 104, and a series of positive going pulses appear at the base of compensating transistor 76 of switch 30 at 180° time phase relation to those applied to the base of transistor 47 of switch 30. The first and second output of element 52 applied to the base of transistor 47 and 76 respectively in element 30, may be referred to as a 1-state output and 0-state output respectively for providing signals indicative of the two mutually exclusive states of bi-stable multivibrator 52, as is well understood in the art.

It is to be appreciated that each of the bistable multivibrators 52, 53, 54, 55 and 56 of FIG. 4 may be constructed similarly, as to resemble, for example, the exemplary circuit of multivibrator 52 shown in FIG. 7. It is to be further appreciated that the feedback line 93 (in FIG. 4) connected to clock control means 58 would be connected to a corresponding output terminal 104 of 32-digit multiplier 56.

It will be seen that the device of this invention provides efficient means for discretely varying the gain of a video signal as a function of the time phase of such video signal relative to a system trigger. Hence, novel and useful structure is described for use in a terrain avoidance monopulse radar receiver for generating a terrain clearance signal indicative of the product of the target angle (provided by the magnitude of a video signal) and range (provided by the time delay of such video signal) of a terrain obstacle.

While the device has been described and illustrated as useful in a terrain avoidance computer, the principle of the invention extends to the analog multiplication of any two variables by discretely adjusting the gain of an analog voltage (representing an analog of one variable) as a discrete function of time (representing a second variable).

Although the invention has been described and illustrated in detail, it is to be clearly understood that the same is by way of illustration and example only, and is not to be taken by way of limitation, the spirit and scope of this invention being limited only by the terms of the appended claims.

I claim:
1. In a monopulse receiver system which generates a periodic video signal having a time-phase relative to a periodic system trigger signal, means for adjusting the gain of said video signal as a function of said time phase, comprising: an input terminal subjected to said video signal from the source thereof, an output terminal, a plurality of attenuating networks commonly interconnecting said input terminal and said output terminal, the output gain weighting of each successive attenuating network being larger than preceding ones of said attenuating networks, a summing resistor interposed between the output of each of said networks and said output terminal, a switch interposed in circuit controlling the actuation of each said attenuating network, clock means responsive to said periodic trigger signal for selectively turning on and off said switches in a predetermined manner during a periodic time interval, whereby the video gain at said output terminal is varied in discrete increments resembling a periodic staircase function.

2. An electronic signaling device responsive to a video signal and a trigger signal and having an output terminal comprising: a plurality of signal attenuating networks commonly adapted to be responsively connected to a common source of said video signal, the gain of such successive network being substantially equal to the sum of the preceding ones of said networks plus the first network, a like number of summing resistors at attenuating networks, each summing resistor interconnecting an output of a mutually exclusive one of said networks and said output terminal, a like number of switches as attenuating networks, each switch interposed in circuit across the output of a mutually exclusive one of said attenuating networks, clock means response to said periodic trigger signal for alternately turning on and off said switches during a periodic time interval, said clock means further including means for selectively controlling successive ones of said switches upon the concurrence of the off-states of preceding ones of said switches during said periodic time interval, whereby the gain of said signaling device is varied in discrete increments resembling a periodic staircase function.

3. An electronic signaling device responsive to a video input signal, and a periodic trigger signal and having an output terminal comprising: a video amplifier having an output and adapted to be responsive to said video input signal, a plurality of video summing resistors commonly connected to said output terminal, a like number of digit switches as video summing resistors, each digit switch interposed in circuit between said video amplifier and a mutually exclusive one of said video summing resistors; said digit switch comprising a gain-attenuating network responsively connected to the output of said video amplifier, and switching means connected across the output of said gain attenuating network for short circuiting said gain attenuating network output; and control means responsive to said periodic trigger signal for alternately turning on and off successive ones of said plurality of digit switches in timed relation providing a combined gain of the summing resistors which varies in discrete steps resembling a periodic staircase function.

4. The device of claim 3 in which said control means is further responsive to the switching state of the last one of said successive plurality of digit switches for turning off all of said digit switches upon the turning-off of said last digit switch.

5. The device of claim 3, in which said control means includes periodic means for alternately turning on and off successive ones of the plurality of digit switches upon the concurrence of the off-states of combinations of preceding ones of the plurality of digit switches.

6. The device of claim 5 in which the gain of each of the attenuation networks associated with said successive switch means is substantially equal to the combined gains of the preceding ones plus the first network.

7. The device of claim 5 in which said successive switches are alternately turned off and on at one-half the frequency of the preceding switch.

8. The device of claim 7 in which said control means includes an individual multivibrator controlling the setting of each of said switches and in which the gain weighting of each successive network is indicative of the period of the periodic output of an associated multivibrator.

9. The device of claim 5, in which said digit switch means includes a compensating switch and associated compensating networks operatively connected to said output terminal and responsive to said control means for providing like output impedances during both switching states of said switch.

10. The device of claim 9 in which each said digit switch includes compensating means for providing a compensation output impedance in the "off" state of such digit switch which is equal to the switching means output impedance during the "on" state of such digit switch and which further provides an output impedance in the "on" state of such digit switch which is equal to the switching means output impedance during the "off" state of such digit switch.

11. In a monopulse receiver system having a periodic system trigger and which generates a video signal, the amplitude and time-phase of which are indicative of target angle and target range respectively, an electronic signal device having an output terminal for adjusting the gain of said video signal as a function of said time phase, comprising: a plurality of signal-attenuating networks, responsive to said video signal, each network providing a mutually exclusive degree of attenuation; a like number of summing resistors as attenuating networks, each summing resistor interconnecting an output of a mutually exclusive one of said attenuating networks to said output terminal; a like number of switches as attenuation networks, each switch connected across the output of a mutually exclusive one of said networks, a monostable control multivibrator adapted to be connected to said periodic system trigger, and having a response state in response to said system trigger which has a duration of more than half the period of said periodic trigger; a free-running multivibrator, a like number of serially interconnected bi-stable multivibrators as switches less one, each bi-stable multivibrator having a first-state input and a second state input and at least a first state output, a first one of said bi-stable multivibrators having its first and second state inputs responsively connected to a common output of said free-running multivibrator, the first and second state input of each successive one of said bi-stable multivibrator being responsively connected to a common output of the preceding one of said bi-stable multivibrators, control means responsively connected to said control multivibrator for starting said free-running multivibrator, said control means being further responsively connected to a last one of said successive bi-stable multivibrators for stopping said free-running multivibrator in a pre-set state, each of said bi-stable multivibrators and said free-running multivibrator operatively connected to drive a mutually exclusive one of said switches, whereby the video gain provided by said combination of networks is adjusted in discrete steps resembling a periodic staircase function.

12. The device of claim 11 in which the relative gain weighting of the switched network associated with each multivibrator corresponds to the period of the periodic output from such multivibrator.

References Cited by the Examiner

UNITED STATES PATENTS

| 2,474,875 | 7/1949 | White | 343—5 |
| 2,498,381 | 2/1950 | Smith | 343—5 |
| 2,880,935 | 4/1959 | Johnson | 328—160 XR |
| 3,012,199 | 12/1961 | Dorczak et al. | 328—186 XR |

ROBERT H. ROSE, *Primary Examiner.*

DAVID G. REDINBAUGH, *Examiner.*